Dec. 5, 1961 J. P. AU WERTER 3,011,516
REDUCING VALVE AND PILOT UNIT
Filed March 31, 1959
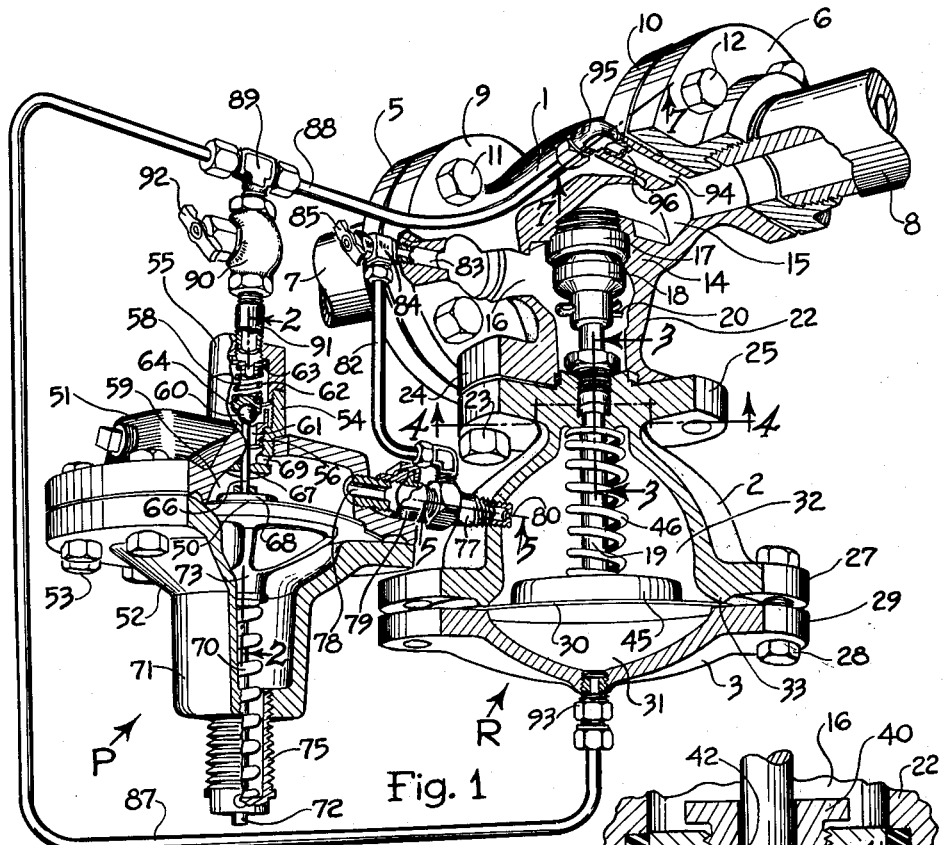
Fig. 1
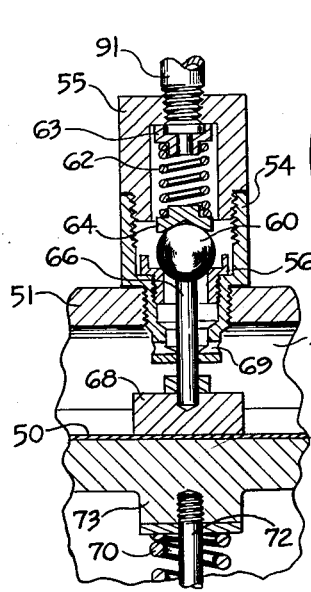
Fig. 2
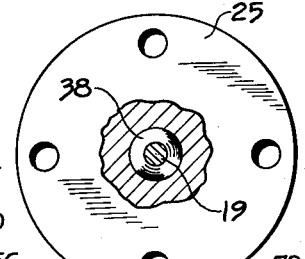
Fig. 3
Fig. 4
Fig. 5
Fig. 6
Fig. 7
Fig. 8
INVENTOR.
Jay P. Au Werter
BY Bosworth, Sessions,
Herzstrom and Knowles
Attorneys

United States Patent Office

3,011,516
Patented Dec. 5, 1961

3,011,516
REDUCING VALVE AND PILOT UNIT
Jay P. Au Werter, 23276 Laureldale Road,
Cleveland, Ohio
Filed Mar. 31, 1959, Ser. No. 803,279
11 Claims. (Cl. 137—489)

This invention relates to pressure regulating valve systems, more particularly to reducing valves of the type actuated by fluid pressure governed in turn by a fluid operated pilot valve.

Reducing valves for controlling the flow of relatively high pressure fluid such as steam from a boiler, power plant or other suitable source to a relatively low pressure use such as the radiators of a building to be heated are commonly governed by pilot valves that respond to the fluid pressure on the low pressure or use side of the reducer. The pilot valve derives actuating fluid from a separate source or, more commonly, from the source of the fluid being controlled, as by tapping into the high pressure fluid supply line ahead of the reducer. Many uses such as the building heating system referred to are preferably supplied fluid continuously but at a variable rate. This it is desirable for the pressure reducer or regulator to meter the fluid in accordance with the demand by increasing and decreasing the flow rate to obtain a smooth although variable flow rather than by positively opening and closing. The latter would result in intermittent supply of the fluid in a series of spurts or injections.

The principal object of the present invention therefor is the provision of a pressure reducing and fluid flow controlling valve and pilot combination which will accurately control various fluids such as air, natural gas, steam, water and oil and in which the opening and closing action of the reducer is modulated in response to relatively small variations in the pressure on the low or use side of the reducer. More particularly the invention contemplates improvements in an arrangement of the type wherein the reducing valve is actuated by a fluid motor such as a diaphragm both sides of which are subjected to variable pressures with the effective force on the motor or diaphragm being the resultant of or difference between the opposed pressures.

Another object is to provide a fluid pressure regulating system of the type comprising a reducing valve and a governing pilot wherein fluid for actuating both the reducer and the pilot is derived from the supply line in which the system is installed and in which the exhaust or spent fluid from the control system and the reducer is discharged or released into the fluid line on the low pressure or use side of the reducer. As a specialized version of this aspect of the invention the fluid is received from the high pressure side of the line through a passage formed in the radial flange or equivalent end connecting means by which the reducer is secured to the supply pipe and the spent or exhaust fluid from the control system is led back into the fluid line through a passage formed in the radial flange or equivalent connector by means of which the reducer is connected to the low pressure side of the line leading to the use.

The present reducing valve and pilot unit is of the non-exhausting type employing packless construction for use, say, in gas lines and in closed rooms or other poorly ventilated areas. The packless construction eliminates the danger of leakage of explosive or noxious gases or other undesired fluids into enclosed areas and the non-exhausting feature having the characteristic of releasing spent operating fluid into the low pressure or use line.

Another object is to make available a pilot operated reducing valve combination having close control and insertable in a pipe line as a complete unit without additional piping or tubing. This object is especially concerned with the provision of a reducer or pressure regulator and pilot valve combination of the type referred to and in which the pilot is demountably attached to and carried by the reducer in the provision of a unit system wherein the pilot is wholly carried by the reducer and the tubing connections are complete between the points of attachment of the reducer to the high and low pressure lines.

Another object is to provide a modulating control system for a pressure reducing valve of the type in which the valve is closed against the pressure in the supply line as distinguished from a reducer of the type in which the valve body is held against its seat by the high pressure fluid. More particularly the invention contemplates a system wherein the valve is seated against the force of the high pressure fluid, is normally urged or biased away from its seat by constantly acting resilient means such as a spring, and is moved toward and held against its seat by fluid motor means which acts against and overcomes both the constantly acting resilient means and the force of the high pressure fluid.

A further object is to control the flow of fluid in a pilot operated reducing valve system by constant rate self-cleaning orifices which modulate the flow of the actuating fluid both into and out of the control system.

Another object is to provide a reducing valve and pilot combination having a minimum number of parts and having connections and working parts readily accessible for inspection and service to minimize installation and service costs. More particularly it is sought to provide such an arrangement of accessible parts which permits servicing and reconditioning of the system without removal from the pipe line.

Other objects and advantages relate to certain novel features of construction, combinations and arrangements of parts which obtain simplicity and economy not only in original manufacture and assembly but in subsequent maintenance and service. The objects and advantages will become apparent as the detailed description proceeds, such description being made by reference to the accompanying drawings forming a part of the specification and wherein is illustrated a preferred embodiment representing the best known mode of practicing the invention.

In the drawings:

FIGURE 1 is a perspective view of the reducing valve and pilot unit combination of the present invention, partly in section and with parts broken away and removed to show the internal construction;

FIG. 2 is an enlarged sectional detail through and parallel to the longitudinal axis of the pilot showing the spherical ball valve and related parts;

FIG. 3 is an enlarged fragmentary sectional detail through and parallel to the longitudinal axis of the reducer showing a portion of the actuating rod and the guide for such rod carried by the neck member;

FIG. 4 is a sectional detail taken transversely through the guide rod of the reducer showing the guide rings;

FIGS. 5 and 6 are elevation and end views, respectively, of the orifice element which meters and controls the flow of fluid into and out of the diaphragm chamber of the reducer; and FIGS. 7 and 8 are elevation and end views, respectively, of the orifice element which meters and controls the flow of high pressure fluid into the control system from the supply line or other high pressure fluid source.

The fluid flow regulating apparatus of the present invention comprises in combination a reducing valve or pressure reducer R and a monitor or control pilot P. The reducer R comprises housing means that includes cast iron or other suitable metal body, neck and head members 1, 2 and 3, respectively. The body is secured and connected for through flow of liquid or other fluid between confronting ends of sections 7, 8 of a pipe line. The load or use pipe 7 leads to a relatively low pressure using instrumentality such as the heating radiators of a building. The supply or source pipe 8 leads to a suitable relatively high pressure fluid source such as a steam power plant or boiler. The reducer body 1 is, for example, formed at its opposite ends with integral attaching flanges 9, 10 respectively secured as by bolts 11, 12 to pipe flange members 5, 6 screwed onto the threaded ends of the pipes. Suitable sealing gaskets are interposed between the flanges in accordance with conventional practice.

The hollow interior of the reducer body 1 is divided as by partition 14 into an inlet chamber 15 in communication with the pipe 8 leading to the high pressure fluid source and an outlet chamber 16 in communication with the pipe 7 leading to the low pressure use. A connecting passage formed in the partition 14 between chambers 15, 16 has internal threads to receive an externally threaded flanged tube or bushing 17 on the lower end of which is formed an annular valve seat. Cooperating with such valve seat to seal the connecting passage between the inlet and outlet chambers and thus control fluid flow between such chambers is a valve body or disc 18 mounted on the upper end of an actuating rod 19. The valve body 18 is formed with a cylindrical socket which receives the upper end of the rod 19 and is held on the rod with a loose fit as by a cotter pin 20 to allow slight tilting for proper seating of the body and for easy removal and replacement in servicing the reducer.

The hollow neck member 2 of the reducer 2 and a lateral (in the present instance, depending) tubular extension 22 of the body 1 are suitably joined together in end to end axially aligned relation as by bolts or cap screws, one of which is indicated at 23, received through aligned openings in integral radial companion flanges 24, 25 of the members. The head 3 is at the opposite or lower end of the neck member 2; a circular outwardly projecting radial flange 27 on the neck carries a plurality of circumferentially spaced bolts 28 that are received through a similar flange 29 forming the periphery of the head. Between the flat inside annular face of the head and a circular upstanding shallow ridge 33 of the neck member is clamped sealingly a flexible impervious diaphragm 30 of a suitable flat sheet metal such as bronze, this diaphragm dividing the closed space provided cooperatively by the neck and head members into first and second chambers 31 and 32 located respectively on first and second sides of the diaphragm 30.

At the joint between the body and neck members 1, 2, one of the members, in this instance the neck member 2, is formed with a wall 35, FIG. 3, which separates the neck or second side chamber 32 from the outlet chamber 16. This wall is drilled or otherwise formed with a central axial opening for the actuating rod 19. The hole 36 constitutes a guideway for the rod. Rings 37, 38 are received in counterbore 39 and are confined by a gland 40 received about the rod 19 and screwed into the internally threaded upper end of the counterbore. These rings merely guide the rod 19, restricting but not completely preventing flow between chamber 16 and 32, thereby providing packless construction. The rings 37, 38 and the gland 40 thus are essentially guide elements and provide simply an instantaneous low order seal about the rod, slight leakage of fluid from one chamber to the other being permissible and not objectionably interfering with the functioning of the system. The rings 37 and the gland nut 40 are preferably formed of brass, bronze or other material suitable for sliding engagement with the steel rod 19, the aligned cylindrical guideways in the ring and gland nut being of slightly less diameter than the holes 36 in the cast iron neck member so that the rod contacts the ring and gland nut but not the metal of the neck member wall 35. The confronting circular end faces of the ring 37 and the gland nut 40 are recessed and formed to provide frusto conical surfaces 41, 42 against which are engaged complemental surfaces formed symmetrically on the opposite sides of the intermediate guide ring 38. This intermediate ring is made of material which may be brass or other suitable metal or, as shown, shape retaining, but deformable, slightly resilient plastic material such as polytetrafluorethylene which maintains a wax-like surface that is self lubricating in guiding engagement with the rod 19. The dished surface 41, 42 inclined at about 45° to the axis of the rod 19 cooperate to bias the deformable ring 38 against the rod 19 when the gland nut 40 is tightened.

The present invention contemplates limited fluid flow between the low side or outlet chamber 16 and the neck chamber 32 on the second side of the fluid actuated means or diaphragm 30 which opens and closes the main valve body 18.

Action of the valve body 18 thus in opening and closing the main connecting passage between the high pressure side 15 and the low pressure side 16 is thus modulated by variation of the fluid pressure in chamber 32 in the neck 2 of the reducer casing. Whatever fluid pressure exists in this chamber augments the force of the spring 46 in opposing the fluid pressure in the head chamber 31 tending to close the valve body 18 against its seat. According to the present invention variation of the fluid pressure prevailing in the neck chamber 32 is achieved by providing for restricted flow of fluid between such chamber and the low side of the reducer comprising the outlet chamber 16. For example, the actuating rod 19 may be formed with an axial passage as by a drill hole, flat, or groove; it may have a loose fit in the guides 37, 38 and 40, providing an annular clearance, or the dividing wall 35 may be drilled to provide a passage. Preferably, however, and as shown, the fluid connection between the chamber 32 on the second side of the diaphragm 30 and the low pressure outlet chamber 16 is obtained by tapping into the fluid passage connecting the secondary chamber 59 of the pilot P to the low pressure side of the reducer. Fluid flow restriction between the low side 16 and the neck chamber 32 is effected, as will appear, by a metering orifice 80 through which the external line is connected into the neck chamber. It is preferable that leakage flow along the rod 19 past the guide ring 38 be restricted to less than the flow rate of the orifice 80.

On the lower end of the rod 19 is secured a circular disc or pressure distributing element 45 which is in operative engagement with the fluid pressure actuated means or diaphragm 30. A helical coil compression spring 46 surrounds the lower end of the rod 19 in the second side or neck chamber 32, the spring reacting at its upper end against the dividing wall 35 and bearing at its lower end against the disc element 45 to bias the latter and the rod 19 axially toward the diaphragm 30. Thus in the normal or unpressurized condition of the reducer R the connecting passage between the inlet and outlet chambers 15, 16 is held open by the action of the spring 46 in biasing the rod 19 toward the diaphragm so as to withdraw the valve body 18 from the seat in the sleeve 17. The strength and characteristics of the spring 46 are selected in relation to the pressures and differentials to be maintained in and between the inlet and outlet chambers 15, 16 as is customary in the regulator art. To seat the valve body 18 and thereby close the connecting passage between the inlet and outlet chambers, pressure is introduced into the first side chamber 31, as will later appear, acts on the diaphragm 30, overcomes the force of the spring 46 and the pressure of fluid in the second side chamber 32 and thereby shifts the rod 19 axially in an upward direction as viewed in FIG. 1. The reducing valve remains closed until the differential of fluid pressures in the first and second chambers 31, 32 drops below that necessary to overcome the spring and other fixed forces tending to shift the rod downwardly to withdraw the valve body 18 from its seat.

The pilot P comprises a pair of circular companion flanged housing members 51, 52 held together at their margins by bolts 53 and clamping between them a fluid pressure actuated means in the form of an impervious circular diaphragm 50 of suitable material such as flat sheet bronze metal which divides the interior of the housing members into two chambers. An upstanding tubular extension 54 is screwed into an opening in the center of the top housing member 51, the upper end of the tubular extension being internally threaded to receive the threaded bottom of an end closure member 55. A short sleeve 56 is threaded into the extension 54 and constitutes a partition between an upper primary chamber 58 comprising space within the extension member 54 and the end closure 55 and a secondary chamber 59 comprising space within the housing member 51. The secondary chamber has one wall comprising the flexible diaphragm 50.

The primary and secondary chambers are in communication with one another through a passage 61 in the partition element 56 except when such passage is closed by a suitable valve body here shown in the form of a stainless steel ball 60 of larger diameter than the passage and disposed in the primary chamber for engagement with an annular valve seat formed about the opening of the passage 61 on the upper end of the element 56. The ball 60 is biased toward its seat by a helical coil compression spring 62 the upper end of which reacts against a hollow stemmed centering element 63 disposed against the end wall of the closure member 55 and the lower end of which reacts against a floating retainer or spider 64 formed with a recess in which the valve ball 60 is received to center the latter over the passage in the partition element 56 and the valve seat. The spider 64 has peripheral sliding engagement with the internal wall of the primary chamber 58 and has flats on its periphery or is formed as with a scalloped periphery or with radial projections to allow free flow of fluid from one side of the spider to the other.

Extending through the passage 61 in the partition element 56, but smaller in diameter than such passage so as to permit fluid flow therethrough is an axial actuating stem 66 which also extends through and has a sliding fit in an axial opening in lower end wall 67 of the tubular extension member 54. The lower end of the stem 66 carries a circular disc or pressure distributing element 68 which is in bearing relation to or directly engageable with the upper flat surface of the flexible diaphragm 50. The effective length of the stem 66 and its end disc 68 is slightly less than the distance between the stainless steel valve ball 60 and the diaphragm 50 when the latter is in its unpressurized undisplaced position. Thus, in the absence of any influencing forces on the diaphragm 50 the valve ball 60 is yieldingly held against its seat on the upper end of the partition element 56 by the action of the spring 62 and there is no fluid connection between the primary and secondary chambers. Since the guide passage in the lower end wall 67 of the extension member 54 may closely surround the stem 66 in obtaining the desired guiding action, the portion of the extension member 54 which projects into the housing member 51 is formed with one or more radial openings 69 for the free flow of fluid between that portion of the secondary chamber 59 within the housing and that portion within the tubular member 54 below the partition element 56.

Acting against the underside of the diaphragm 50 in opposition to fluid pressure in the secondary chamber 59 is a suitable yieldingly but constantly acting adjustable pressure means conveniently provided in the form of a helical coil compression spring 70. Adjustment of the present device to alter the low side pressure maintained in the outlet chamber 16 is accomplished by thus varying the force exerted against the bottom of the pilot diaphragm 50 in opposition to the force of the fluid pressure in the secondary chamber 59. The chamber below the diaphragm may, for example, be made fluid tight, filled with air or other fluid, and connected by tubing to pressure altering means such as a bellows at a remote control station. Movement of the bellows at the remote control point, manually or as by thermostatically controlled means, thus may be made to vary the fluid pressure acting against the underside of the pilot diaphragm 50. Such a remote fluid pressure system may be in addition to or in lieu of the compression spring 70. A weighted lever may be pivoted on the housing of the pilot P and arranged to react against the stem 72 in lieu of or in augmentation of the force provided by the compression spring 70. The spring 70 is contained in and extends coaxially through a depending tubular portion 71 of the housing member 52 and is received with a loose fit about a stem 72 projecting downwardly axially through the housing member from a spiderlike pressure distributing head 73 to which the upper end of the guide stem is fast. Such head makes contact with the underside of the diaphragm 50 over a large area of the latter. The upper end of the spring 70 is seated and reacts against the head 73, the lower end of the spring being received in and reacting against the bottom end of an adjusting cup 75 screwed into an internally threaded axial hole in the lower end wall of the tubular housing extension 71. The bottom of the adjusting cup 75 is formed with an axial through passage in which the stem 72 is guidingly received for relative endwise movement of the stem as the spring 70 is compressed or allowed to expand by adjustment of the cup and as the head 73 yields to pressure induced movement of the diaphragm. The spring 70 may be adjusted by means of the threaded cup 75 to maintain any desired pressure in the outlet 16; preferably, however, it is supplied in different strengths, depending upon the pressure to be maintained on the low pressure side of the line. Thus, a weak spring is used to maintain a pressure in the use line 7 up to about five pounds pressure gauge; a medium strength spring is used for higher pressure up to about twenty pounds gauge; and a relatively strong spring is used for pressure of from about twenty pounds gauge to about 100 or more pounds gauge. By screwing up the adjusting cup 75 the spring tension is increased and more pressure is needed on top of the pilot diaphragm 50 to allow the ball 60 to seat. This gives a higher pressure in the outlet 16 or low pressure side. By unscrewing the adjusting cup 75 a lower pressure is obtained in the outlet.

The pilot P may be suitably supported at a position remote from the reducer R but preferably, and as illustrated is demountably supported on the reducer as by suitable connecting pipe means placing the secondary chamber 59 of the pilot in continuous communication with the second side chamber 32 of the reducer R. This connecting pipe means conveniently takes the form of a T fitting 77 specialized in construction and function, as will appear, screwed into a tapped hole in the reducer neck 2 and a short nipple 78 screwed into a tapped hole in the housing member 51 of the pilot. The T fitting and the nipple are joined by a union 79 which may be readily separated or broken apart for removal of the pilot from the reducer in effecting service or repair of the system. The threaded end of the fitting 77 screwed into the neck of the reducer is closed except for an axial metering orifice 80 which regulates the flow of fluid into and out of the second side chamber 32, being the only effective opening into such chamber. The branch or side connection of the fitting 77 is connected by tubing 82 and conventional screw fittings to the outlet chamber 16 of the reducer body 1. This connection is made through a drilled and tapped radial passage 83 in the attaching flange 9. A valve cock 84 is included in the connection and is capable of closing the branched conduit or passage thus provided between the outlet chamber 16 and the chambers 32 and 59. The valve cock is operated by a handle 85 which actuates an internal valve body or closure conventionally. The coupling flange 9 of the reducer provides a convenient support for the valve cock 84 the body of which is threaded into the outer end of the radial passage 83. Certain advantages of the invention are achieved without the flow restriction referred to either into or out of the neck chamber 32 in an arrangement wherein substantially free flow of fluid is permitted between the neck chamber 32 and the outlet chamber 16; such an arrangement is suitable, for example, in systems wherein the demand for fluid has a relatively slow rate of variation. Moreover, flow restriction can be accomplished as by using capillary or small size tubing for the connection in lieu of the metering orifice 80. The system shown provides for restriction by means of the orifice 80 both into and out of the neck chamber 32, it is feasible however, to provide for a high rate of flow out of and a low rate of flow into the chamber as by a check valve having an orifice or grooved seat, such combination being useful in situations requiring particularly rapid closing and relatively slow opening of the main reducer valve.

Since the fluid pressure in the head chamber 31 on the first side of the diaphragm 30 (and which tends to close the main reducer valve) is opposed by the pressure in the neck chamber 32 on the second side of the diaphragm, it is essential that upon predetermined increase in pressure in the outlet chamber 16, evidencing decrease in demand, and prior to effective pressure increase in the neck chamber 32, the restriction of flow into the chamber 32, as by means of the orifice 80, be sufficient to result in backing up of pressure through the low pressure side of the control system into the outlet chamber 16 to be effective in the secondary chamber 59 to close the pilot valve and thereby divert the high pressure fluid into the head chamber 31 so as to initiate closing of the main valve 18.

The first side chamber 31 of the reducer is connected to the inlet chamber 15 of the reducer body 1 by conventional screwed fittings and series tubes 87, 88. These tubes are joined by a T fitting 89 having a branch by which they are connected to the primary chamber 58 of the pilot P. This pilot connection includes a tube 91 let into the top end of the closure member 55 and in communication with the primary chamber 58 through an axial opening or passage through the stem of the element 63 which centers and serves as a reaction seat for the valve closing spring 62.

In the fluid connection between the primary chamber 58 of the pilot valve P and the high pressure fluid tube 88 which receives its fluid supply from the high pressure fluid supply line 8 suitable flow stopping valve means is provided for effecting positive closing or dead-ending of the reducer. Such an arrangement has advantages in numerous situations. For example, the stop valve may be of the solenoid or electromagnetic type which permits remote actuation as from a centralized control point. Another application contemplates the use of a thermostatically controlled stop valve having a heat sensing element such as a room thermostat exposed to the heat of the use being supplied. In the present instance, for simplicity, the dead ending valve is shown as a simple manually actuated stop cock 90. Actuation of the valve 90 by its handle 92 opens or closes the fluid connection between the tubes 87, 88 and the primary chamber 58 of the pilot.

The tube 87 is in communication with the first side chamber 31 through a conventional fitting 93 screwed into an internally threaded center opening in the casing head 3. The tube 88 communicates with the inlet chamber 15 through a drilled radial passage 94 in the attaching flange 10 of the reducer casing member 1. The connection is made by an elbow fitting 95 having one end screwed into the radial passage 94. This one end of the fitting is closed except for an axial metering orifice 96 which controls the rate at which high pressure fluid from the inlet chamber 15 and supply pipe 8 enters the control system.

The tubing connection provided as described above between the inlet chamber 15 and the chamber 31 on the first side of the diaphragm 30 supplies the high pressure fluid to the first side of the diaphragm at a rate dependent upon the capacity of the metering orifice 96. With the valve cock 90 closed as during installation or for servicing the use instrumentality, escape of fluid through the pilot is prevented and the resulting pressure built up in the chamber 31 positively overcomes the spring 46 and forces the valve body 18 against the seat of the sleeve 17 to thereby positively close the connecting passage between the chambers of the reducer body 1. The rate of such closing is dependent upon the flow rate of the high pressure fluid through the orifice 96 into the high pressure side of the control system. However, for control of the reducer by the pilot P the valve cock 90 remains open, this being the normal condition.

*Operation.*—Assuming the supply pipe 8 is connected to a suitable source of high pressure fluid such as steam at, say, 150 pounds per square inch gauge as supplied, for example, by a central heating station to an office building and the pipe 7 is connected to a relatively low pressure use at from about 5 to about 100 pounds per square inch gauge, such as the heating radiators of such a building, and assuming further that, at the moment, the use is satisfied and in a condition of stability the low side or back pressure in the outlet chamber 16 is maintained in the secondary chamber 59 of the pilot through the tubing 78, 82, the valve cock 84 being open. Such low side pressure has overcome the control spring 70 and allowed the ball valve 60 to engage the circular seat on the partition element 56. This closing of the connecting passage 61 between the pilot chambers has allowed the pressure in the first side chamber 31 of the reducer to build up to that of the inlet chamber 15 with the result that the first mentioned fluid pressure actuated means comprising the diaphragm 30 of, say, .010 inch thick sheet Phosphor bronze in the example mentioned, has deflected and overcome the spring 46 and seated the valve body 18 positively to close the connecting passage between the chambers 15, 16.

Establishment of a demand for fluid at or by the use, manifested by a lowering of the fluid pressure in the outlet chamber 16, results in flow of fluid from the secondary chamber 59 of the pilot and from the second side chamber 32 of the reducer into the outlet chamber 16 through the tube 82. The outflow from the reducer chamber 32 is at a relatively low rate because of the metering orifice 80 formed by drilling an axial hole in the end wall of the fitting 77 by a number 53 drill and having a diameter of about .0595 inch in the example mentioned. However the outflow from the pilot secondary chamber 59 is at a relatively high rate and quickly reduces the pressure in the such chamber. The force of the spring 70 on the opposite of the second mentioned fluid pressure actuated means or diaphragm 50, of say, .010 inch thick Phosphor bronze sheet metal in the example mentioned, thus overcomes the fluid pressure in the chamber 59. The resulting deflection of the diaphragm by the spring 70 is transmitted by the disc 68 to the stem 66 which raises the ball 60 from its seat on the partition element 56. This opening of the pilot valve communicates the primary chamber 58 with the secondary chamber 59 for the flow of the relatively high pressure fluid from the first side diaphragm chamber 31 of the reducer through the tubes 87, 91, through the primary chamber 58 and into the secondary chamber 59 from whence it is discharged into the relatively low pressure outlet chamber 16 through the tubes 78, 82, the valve cock 90 being open. This opening of the pilot valve by unseating of the ball 60 results also in a flow of some fluid from the high pressure inlet chamber 15 into the primary chamber 58 through the tubes 88, 91.

This flow, however, is regulated by the metering orifice 96 formed as by drilling an axial hole in the inserted end wall of the elbow fitting 95, by a number 50 drill, the orifice having a diameter of about .070 inch in the example given. This orifice restricts the flow to a rate enough less than that accommodated through the passage 61 of the pilot valve to obtain lowering of the pressure in the diaphragm chamber 31 sufficient to permit the spring 46 to effect opening of the main reducing valve. Thus the size of the metering orifice 96 influences the rate at which the reducing valve opens and closes. The smaller the orifice 96, the faster the opening and the slower the closing, and vice versa.

The fluid pressure in the chamber 32 on the second side of the diaphragm 30 opposes the fluid pressure in the first side chamber 31. However, the pressure in the first side chamber is generally higher than that in the second side chamber 32 because the latter communicates directly with the low pressure outlet 16 whereas the first side chamber 31 communicates directly with the high pressure inlet 15. Since the chamber 32 communicates with the outlet chamber 16, lowering of the pressure in the latter, which is the manifestation of the demand of the use for additional fluid, results in an outflow of fluid from the chamber 32 through the metering orifice 80. The fluid demand condition which causes lowering of the pressure in the first side or head chamber 31 also causes lowering of the pressure in the second side chamber 32. The differential pressure represents the measure of the effective force on the diaphragm. The orifice 80 thus influences the opening rate of the main reducing valve. A relatively small orifice which allows escape of fluid at a low rate tends to provide fast opening whereas a large orifice allowing rapid escape of fluid results in a low opening rate of the main valve.

The opening of the main reducer valve by the withdrawal of the valve body 18 from the valve seat of the sleeve 17, as described, permits high pressure fluid from the supply pipe 8 and the inlet chamber 15 to flow into the outlet chamber 16 and thence through the pipe 7 to the using instrumentality or system. When the demand is satisfied, the fluid pressure builds up in the outlet chamber 16 and the resulting increase in back pressure, transmitted through the passage 83 and the tubes 82, 78 to the secondary chamber 59 of the pilot valve P overcomes the force of the spring 70 and allows the ball valve 60 to be seated by the spring 62. This closes the pilot valve and prevents escape of fluid from the high pressure system comprising the head chamber 31, the primary chamber 58 and the tubes 87, 88 and 91. With the high pressure system thus closed or dead ended, the continuous flow of high pressure fluid into the tubes 87, 88 through the metering orifice 96 builds up the pressure in the chamber 31 on the first side of the diaphragm 30 overcoming the forces acting against the second side of the diaphragm and positively forcing the valve body 18 against its seat to close the main reducing valve.

As mentioned above, one of the forces which opposes the closing of the main reducing valve 18 is the fluid pressure in the chamber 32 which acts against the second side of the diaphragm 30 and augments the force of the spring 46. In this connection it is to be observed that the increase of the pressure in the outlet chamber 16, occurring when the demand for fluid has been satisfied or reduced, and which, transmitted to the secondary chamber 59 of the pilot valve, results in seating of the valve ball 60 to apply the high pressure fluid to the first side of the diaphragm 30, as just described, also is transmitted through the tubing 82, 77 to the chamber 32. The resulting build up of pressure in the chamber 32 increases the force opposing the closing of the main reducing valve. The rate of this increase is determined by the size of the metering orifice 80 which governs the flow rate of fluid entering the diaphragm chamber 32. The smaller this orifice, the smaller the flow rate and therefore the slower is the build up of pressure in the diaphragm chamber to oppose the valve closing pressure in the chamber 31 on the first side of the diaphragm. Conversely, the larger the orifice 80, the faster the pressure builds up in the chamber 32 on the second side of the diaphragm and the greater the force opposing the valve closing. Hence, the smaller the metering orifice 80 the faster the opening and closing of the main pressure reducing valve; the larger the metering orifice 80 the slower the opening and closing of such main valve.

The size of the main metering orifice 96 which governs the supply of fluid to the control system influences not only the opening rate, as discussed above, but also the closing rate of the main reducing valve. The smaller the orifice 96 the slower will be the rate of flow of high pressure fluid into the high pressure system. Thus, a relatively small metering orifice 96 provides or results in a relatively slow closing main valve whereas a relatively large orifice results in a fast closing valve.

In the operation of the present regulating unit the chamber 32, the rate of pressure change of which is governed by the metering orifice 80, has a modulating effect on the first fluid pressure actuated means or diaphragm 30. This modulation of the main diaphragm prevents objectionably fast action of the reducing valve either in opening (as upon a sudden pressure drop in the outlet chamber) or in closing (as upon sudden increase in back pressure in the outlet chamber 16 or low pressure side). Hence, fluttering is eliminated and smooth, even operation achieved.

The present invention thus provides a reducing valve and pilot control therefore assembled together as a compact regulating unit. The reducer is of the so-called packless type in that it is unnecessary to provide a fluid-tight seal between the chamber 16 in the body member of the reducer and the neck chamber 32 to which the first or main pressure actuated means or diaphragm 30 is exposed. Thus the ring 38 and the centering elements 37, 40 for such ring function essentially as guide means for the valve actuating rod 19. The flow rate or leakage through the dividing wall 35 is at a rate sufficiently low to allow faster variation of fluid pressure in the head chamber 31 than in the neck chamber 32.

The pressure reducing system of the present invention characteristically has the main valve body 18 seating against the high pressure prevailing in the inlet chamber 15. Thus the present device is distinguished from reducers of the type in which the main valve body is held against its seat by the high pressure fluid and to open the connecting passage, must be unseated by means which overcomes the high fluid pressure acting on the valve body. The present arrangement, wherein two sided fluid pressure actuate means such as the diaphragm 30 operates in response to differential fluid pressure to seat the main valve 18 against the force of the fluid on the high pressure side of the reducer, results in smoother opening and closing action, eliminates chattering, and gives better and closer control of the fluid flow through the reducer. Although the unit is shown with the neck member 2 in generally suspended relation below the pipe line comprising the pipes 7, 8, it is apparent that the device functions in any other position and may be mounted with the neck 2 upstanding from he pipe line or extending laterally therefrom.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. In apparatus for regulating the flow of fluid through a pipe line from a relatively high pressure source to a relatively low pressure use; a pressure reducer comprising casing means providing inlet and outlet chambers and having attaching means including one connector member readily connectable to and disconnectable from such a source and formed with a passage continuous with the inlet chamber and including another connector member readily connectable to and disconnectable from such a use and formed with a passage continuous with the outlet chamber, said casing means being formed with a connecting passage between the chambers and a valve seat in such passage; a valve and means mounting it in the casing means for movement to engage the seat to isolate the chambers one from the other and for movement away from the seat to open the connecting passage; two-sided first fluid pressure actuated means in the casing means, said pressure actuated means being operatively connected to the valve, responsive to fluid pressure applied to its first side to move the valve to close and to its second side to move the valve to open the connecting passage; said casing means defining first and second chambers in which the first and second sides of the pressure actuated means are respectively exposed; a pilot comprising housing means providing primary and secondary chambers, a connecting passage between the housing chambers and a valve seat; a valve body cooperatively associated with the pilot housing valve seat to control fluid flow between such housing chambers; yielding means acting constantly to bias the valve body away from he pilot valve seat; second fluid pressure actuated means in the housing means and constituting one wall of the secondary chamber, said second pressure actuated means acting in opposition to said yielding means upon increase in pressure in the secondary chamber to effect closing of the connecting passage of the pilot; means providing a first fluid passage system comprising first tubular conduit means external to the casing means and to the housing means rigidly and directly connecting the housing means to the casing means and supporting the former on the latter, said conduit means providing a pressure equalizing fluid passage between the second and secondary chambers, said system also including second tubular conduit means external to the casing means and to the housing means connecting the fluid passage of the supporting conduit means to said other connector member and providing a pressure equalizing fluid passage between the second and secondary chambers and the outlet chamber, means providing a second fluid passage system comprising third tubular conduit means external to the casing means and to the housing means connected at one end to said one connector member and at its other end to the casing means and providing a fluid passage between the inlet chamber and said first chamber, said second system also including fourth conduit means connecting the last named fluid passage to the primary chamber for pressure equalizing fluid flow therebetween, and means limiting fluid flow into the third tubular conduit means of the second system from the inlet chamber to a predetermined rate at the design source pressure, the rigidly connected casing means and housing means, together with the means providing said first and second fluid systems constituting a unitary assembly in which the third conduit means connected to the one connector member and the second conduit means connected to the other connector member are adapted to remain so connected in assembling the regulating apparatus in and in removing it from a pipe line in connecting the connector members to and disconnecting them from such a source and such a use.

2. In apparatus as defined in claim 1, the first system including means providing an orifice limiting fluid flow into and out of the second chamber through the passage in the supporting conduit means to a predetermined rate at the design source pressure, said orifice providing means being attached to and wholly supported by the first tubular conduit means.

3. In apparatus as defined in claim 2, the first conduit means comprising a fitting formed with threads and screwed into the casing means and said orifice providing means being carried by said fitting.

4. In apparatus as defined in claim 1, the third conduit means comprising a fitting formed with threads and screwed into the one connector member and having an orifice constituting the flow limiting means of the second system.

5. In apparatus as defined in claim 1, the second system including valve means in and wholly supported by said fourth conduit and actuatable to arrest the flow of fluid between the systems and thereby effect positive closing of the valve in the casing means by the flow of fluid from the inlet chamber to the first chamber.

6. In apparatus as defined in claim 1, the connector members comprising flanges disposed radially with respect to their passages, said flanges being formed with radial passages communicating at their inner ends with the passages continuous with the inlet and outlet chambers, respectively, and at their outer ends with the passages in the third conduit means and in the second conduit means, respectively.

7. In apparatus as defined in claim 6, the second and third conduit means each comprising a threaded fitting, the fitting of the third conduit means being screwed into the flange of the one connector member and the fitting of the second conduit means being screwed into the flange of the other connector member.

8. In fluid flow regulating apparatus as claimed in claim 1, the first tubular conduit means including a union providing for facile demounting and remounting of the pilot housing from and onto the pressure reducer casing, and the second tubular conduit means being connected to said first conduit means at a point between the union and the casing.

9. In fluid flow regulating apparatus as claimed in claim 1, the first tubular conduit means including a T fitting and the second tubular conduit means being connected to said T fitting.

10. In fluid flow regulating apparatus as claimed in claim 9, the third tubular conduit means including another T fitting and the fourth conduit means being connected between said other T fitting and the pilot housing means.

11. In fluid flow regulating apparatus as claimed in claim 1, the third conduit means including a T fitting and the fourth conduit means comprising tube means connected between said T fitting and the pilot housing means.

References Cited in the file of this patent

UNITED STATES PATENTS

| 917,443 | Jahn | Apr. 6, 1909 |
| 942,122 | Whitesell | Dec. 7, 1909 |
| 948,452 | Kennington | Feb. 8, 1910 |
| 1,814,530 | Spence | July 14, 1931 |
| 1,906,651 | Spence | May 2, 1933 |
| 2,883,145 | Sage | Apr. 21, 1959 |